United States Patent [19]

New

[11] Patent Number: 4,943,940

[45] Date of Patent: Jul. 24, 1990

[54] FLOATING POINT ADD/SUBTRACT AND MULTIPLYING ASSEMBLIES SHARING COMMON NORMALIZATION, ROUNDING AND EXPONENTIAL APPARATUS

[75] Inventor: Bernard J. New, Los Gatos, Calif.

[73] Assignee: Advanced Micro Devices, Inc., Sunnyvale, Calif.

[21] Appl. No.: 655,482

[22] Filed: Sep. 27, 1984

[51] Int. Cl.⁵ .................................................. G06F 7/48
[52] U.S. Cl. .................................................... 364/748
[58] Field of Search ............................. 364/748, 736

[56] References Cited

U.S. PATENT DOCUMENTS

| | | | |
|---|---|---|---|
| 3,787,673 | 1/1974 | Watson et al. | 364/736 |
| 3,922,536 | 11/1976 | Hampel et al. | 364/748 |
| 4,075,704 | 2/1978 | O'Leary | 364/748 |
| 4,229,801 | 10/1980 | Whipple | 364/748 |
| 4,395,758 | 7/1983 | Helenius et al. | 364/200 |
| 4,511,990 | 4/1985 | Hagiwara et al. | 364/748 |
| 4,592,006 | 5/1986 | Hagiwara et al. | 364/748 |
| 4,612,628 | 9/1986 | Beauchamp et al. | 364/748 |

FOREIGN PATENT DOCUMENTS 0110160  6/1984  European Pat. Off. ............ 364/748

Primary Examiner—Dale M. Shaw
Attorney, Agent, or Firm—Fliesler, Dubb, Meyer & Lovejoy

[57] ABSTRACT

A fully combinatorial floating point arithmetic apparatus is provided comprising separate fully combinatorial add/subtract and multiply assemblies which share a common normalization, rounding and exponential processing apparatus.

9 Claims, 1 Drawing Sheet

FLOATING POINT ADD/SUBTRACT AND MULTIPLYING ASSEMBLIES SHARING COMMON NORMALIZATION, ROUNDING AND EXPONENTIAL APPARATUS

BACKGROUND OF THE INVENTION

1. Field of the Invention

The present invention relates to floating point arithmetic apparatus in general and to a floating point arithmetic apparatus comprising separate fully combinatorial add/subtract and multiplying assemblies which share a common normalization, rounding and exponent processing apparatus in particular.

2. Description of Prior Art

When adding or subtracting two numbers comprising different exponential components it is necessary to first align the numbers. Aligning the numbers comprises modifying the mantissa and exponential component of one of the numbers so that both of the numbers have the same exponential component. For example, when adding or subtracting $12.5 \times 10^3$ and $1.4 \times 10^2$, the numbers $12.5 \times 10^3$ and $1.4 \times 10^2$ are first aligned by changing $1.4 \times 10^2$ to $0.14 \times 10^3$. After the numbers are aligned, the mantissas are added or subtracted in a conventional manner. After the mantissas are added or subtracted, the result may be normalized.

Normalizing the result involves changing the result to have a single integer. For example, if the numbers $12.5 \times 10^3$ and $0.14 \times 10^3$ are added, the result is $12.64 \times 10^3$. Normalizing the result involves changing the mantissa and the exponential component of the number from $12.64 \times 10^3$ to $1.264 \times 10^4$. After normalizing the result, the mantissa may be rounded.

Rounding the mantissa after normalizing the result involves reducing the mantissa of the result to a predetermined number of nonintegers. For example, if it is desired to round the mantissa to two nonintegers, the mantissa in the latter example would be changed from $1.264 \times 10^4$ to $1.26 \times 10^4$. In general, the second place noninteger, i.e. 6 in the example, would have been increased to 7 if the third place noninteger, i.e. 4 in the example, had been 5 or greater.

When multiplying two numbers having an exponential component, the exponential components are added and the mantissas of the numbers are multiplied in a conventional manner. Thereafter, as in the case of addition and subtraction described above, the resulting product may be normalized and then rounded off.

Under certain circumstances, the result of an addition, subtraction or multiplication may be exceptional. That is, the result may be zero, infinity or a result which cannot be interpreted as a legitimate number. In such cases, it is conventional practice in digital arithmetic apparatus to substitute a special number in place of the exceptional result which is indicative of the nature of the exceptional result.

In general, the above-described arithmetic operations of addition, subtraction and multiplication are carried out in either of two types of digital apparatus. The first of the types comprises logic circuits in combination with registers used for storing intermediate and final results. The second of the types comprises strictly logic circuits in a combinatorial arrangement which does not require or use registers.

An example of the first type of arithmetic apparatus is disclosed in U.S. Pat. No. 4,229,801, issued to D. L. Whipple on Oct. 21, 1980. In Whipple the above-described arithmetic operations are carried out in essentially two dedicated circuits. One of the circuits is dedicated to processing the exponential components of the numbers being operated on. The other of the circuits is dedicated to processing the mantissas of the numbers being operated on. The circuits described comprise one or more registers and perform substantially all of the described arithmetic operations using the same circuit components.

In prior known circuits which employ strictly combinatorial techniques which do not include the use of registers to perform arithmetic operations, i.e. the second type of apparatus used for that purpose, it has been the practice to provide one assembly of circuits to perform all the operations associated with addition and subtraction and another assembly of circuits to perform all the operations associated with multiplication.

When the assembly of circuits used for addition and subtraction is compared with the assembly of circuits used for multiplication, it is found that there is a significant percentage of them which are identical. For example, it is found that the circuits used for normalization, rounding, exponent processing and exceptional result handling are substantially identical in both the combinatorial add/subtract assembly and the separate multiply assembly. This substantial identity of circuits in the two assemblies is wasteful of space and a principal disadvantage proscribing the use of prior known fully combinatorial arithmetic apparatus.

SUMMARY OF THE INVENTION

In view of the foregoing, a principal object of the present invention is a fully combinatorial floating point arithmetic apparatus comprising separate add/subtract and multiply assemblies which share common exponent and mantissa processing apparatus.

In accordance with the above object there is provided an add/subtract assembly and separate multiply assembly, a multiplexer coupled to an output of the above-described assemblies, a normalizing and rounding assembly coupled to an output of the multiplexer, an exponent processing assembly and an exceptional result handling assembly coupled to outputs of the exponent processing and normalizing and rounding assemblies.

In operation, the exponential components of a pair of numbers R and S are transferred to the exponent processing assembly and the mantissas thereof are transferred in parallel to the add/subtract and multiply assemblies.

In the add/subtract assembly there is provided a circuit responsive to a control signal from the exponent processing assembly which is proportional to the difference between the exponential components of the numbers for aligning one of the mantissas with the other of the mantissas. After the mantissas are aligned, they are either added or subtracted.

In the multiply assembly the mantissas are multiplied.

Depending on the result desired, e.g. add/subtract or multiply, the output of one of these assemblies is selectively transferred by the multiplexer to the normalizing and rounding assembly.

In the normalizing and rounding assembly, the output, i.e. result, of the arithmetic operation is reduced to a single integer and a selected number of nonintegers. This reduction results in the generation of a control signal which is used by the exponent processing assembly for adjusting the magnitude of the exponential component provided at its output.

The output of the normalizing and rounding assembly and the exponent processing assembly are then transferred to the exceptional result handling assembly.

In the exceptional result handling assembly, a special number is substituted for any result which does not comprise a legitimate number recognized by the apparatus. Included among such results are results corresponding to zero and infinity.

BRIEF DESCRIPTION OF THE DRAWING

The above and other objects, features and advantages of the present invention will become apparent from the following detailed description of the accompanying drawing, in which.

DETAILED DESCRIPTION OF THE DRAWING

Figure 1:
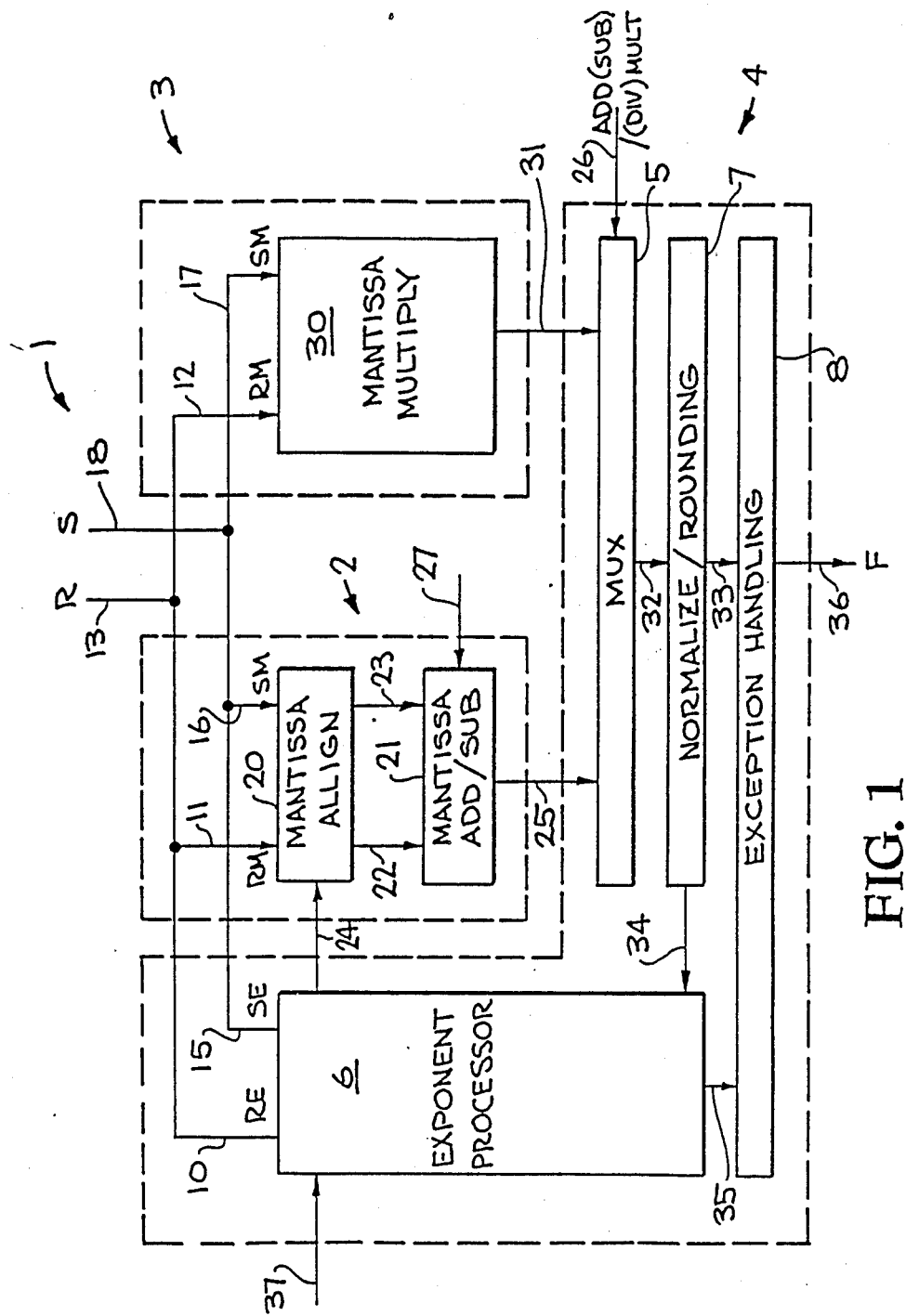
FIG. 1 is a block diagram of an embodiment of the present invention.

Referring to FIG. 1, there is provided in accordance with the present invention a fully combinatorial arithmetic apparatus designated generally as 1. In the apparatus 1 there is provided an add/subtract assembly designated generally as 2, a multiply assembly designated generally as 3 and an assembly of circuits designated generally as 4 which are shared by the assemblies 2 and 3.

In the assembly 4 there is provided a multiplexer 5, an exponent processing assembly 6, a normalize/rounding assembly 7 and an exceptional result handling assembly 8.

The assemblies 2, 3 and 6 are provided with a plurality of input lines 10, 11 and 12 which are coupled to a source of a first number R by means of a line 13 and a plurality of input lines 15, 16 and 17 which are coupled to a source of a second number S by means of a line 18.

In the add/subtract assembly 2 there is provided a mantissa aligning circuit 20 and a mantissa add/subtract circuit 21. The mantissa aligning circuit 20 is provided with a pair of inputs coupled to the lines 11 and 16, a pair of outputs coupled to a pair of output lines 22 and 23 and a control signal input for receiving a control signal from the exponent processing assembly 6 on a control signal line 24.

The mantissa add/subtract circuit 21 is provided with a pair of inputs coupled to the lines 22 and 23, a control signal input line 27 which is used for selecting between the add/subtract functions and an output coupled to an output line 25.

In the multiply assembly 3 there is provided a mantissa multiply circuit 30. Circuit 30 is provided with a pair of inputs coupled to the lines 12 and 17 and an output coupled to an output line 31.

In the multiplexing circuit 5 there is provided a pair of inputs coupled to the lines 25 and 31 and an output coupled to an output line 32.

In the normalizing/rounding circuit 7 there is provided an input coupled to the line 32, an output coupled to an output line 33 and a control signal output for providing a control signal to the exponent processing assembly 6 on a control signal line 34.

In the exponent processing apparatus 6 there is provided a pair of inputs coupled to the lines 10 and 15, a control signal output coupled to the control signal line 24, a control signal input coupled to the control signal line 34, a control signal input line 37 which is used for selecting between the add/subtract and multiply functions and an output coupled to an output line 35.

In the exceptional result handling circuit 8 there is provided a pair of inputs coupled to the lines 33 and 35 and an output coupled to an output line 36 for providing a result F.

In operation, a pair of numbers R and S, each comprising a mantissa and an exponential component, is applied to the lines 13 and 18, respectively. After the numbers R and S are applied to the lines 13 and 18, the exponential component of the number R is transferred to the exponent processing assembly 6 by means of the line 10 as shown by the designation $R_E$ while the exponential component of the number S is sent to the exponent processing assembly 6 by means of the line 15 as shown by the designation $S_E$. At the same time, the mantissas of the numbers R and S are sent to the add/subtract and multiply assemblies 2 and 3 by means of the lines 11, 12, 16 and 17, respectively, as shown by the designations $R_M$ and $S_M$.

After the exponential components $R_E$ and $S_E$ are transferred to the exponent processing apparatus 6, the exponent processing apparatus 6, in response to a control signal on the control line 37 indicating that the add/subtract function is to be performed, changes the magnitude of the lesser of the exponential components to equal the magnitude of the greater of the exponential components and generates a control signal proportional to the difference between the exponential components. The control signal thus generated is transferred to the mantissa aligning circuit 20 by means of the control line 24.

In response to the control signal on the control line 24, the mantissa aligning circuit 20 changes the magnitude of the mantissa, i.e. aligns the mantissa, associated with the lower-valued exponential component by shifting the mantissa a predetermined number of places to the right. That is, the mantissa is shifted to the right one place for each factor of 10 difference between the exponential components. For example, when adding or subtracting $12.5 \times 10^3$ and $1.4 \times 10^2$, the exponent processing assembly 6 changes the exponential component $10^2$ to $10^3$ and generates a control signal corresponding to this change. It should be noted that while the examples herein are described in terms of decimal numbers, the apparatus of the present invention operates on the binary equivalent thereof. In response to the control signal thus generated, the mantissa aligning circuit 20 changes the number 1.4 to 0.14 such that a signal corresponding to the mantissa 12.5 appears on the line 22 and a signal corresponding to the mantissa 0.14 appears on the line 23. Thereafter, the mantissa add/subtract circuit 21 in response to a control signal on the control line 27 adds or subtracts the mantissas and provides on the output line 25 a signal corresponding to the sum 12.64 or the remainder 12.36. From the foregoing it is evident that the larger of the exponents is provided as an output of the exponent processor 6 subject to adjustment in response to the control signal in line 34 generated by the normalizing/rounding circuit 7, as further described below.

If, on the other hand, the control signal on the control line 37 indicates that a multiplication is to be performed, the exponent processing assembly 6 adds the exponential components of the numbers R, S and the multiply circuit 30 multiplies the mantissas of the numbers R and S to provide a result, i.e. product, on the output line 31.

In response to a control signal on the control signal line 26, the multiplexer 5 then selectively transfers either the result from the add/subtract unit 21 which appears on the output line 25 or the result from the multiply circuit 30 which appears on the line 31 to its output line 32.

In response to the result appearing on the output line 32, the normalizing/rounding circuit 7 first normalizes and then rounds the result appearing on the line 32. During the normalizing process, the circuit 7 provides a control signal on the line 34 which is proportional to the number of places the result is shifted right or left to provide a mantissa comprising a predetermined number of integers, e.g. one. For example, if the result appearing on the line 32 is a signal corresponding to the decimal number 12.64, the normalizing/rounding circuit 7 reduces the number 12.64 to the number 1.264 and produces a control signal on the line 34 corresponding to an exponential component of $10^1$. In response to the control signal on the line 34, the exponent processing assembly 6 increases the value of the exponential component associated with the number 12.64 by one corresponding to a factor of 10.

After the result on the output line 32 has been normalized, the normalizing/rounding circuit 7 rounds the resulting mantissa 1.264 to a predetermined number of nonintegers, e.g. 2. For example, given the number 1.264, the normalizing/rounding circuit 7 rounds the number 1.264 to the number 1.26. On the other hand, if the number had been 1.236, as in the subtraction example described above, the resulting number would have been rounded off to 1.24.

After the result on the output line 32 has been normalized and a corresponding change has been made to the exponential component being processed in the exponent processing assembly 6, the resulting mantissa on the output line 33 and the resulting exponential component on the output line 35 are combined in the exceptional handling assembly 8 and transferred to the output line 36 for further processing as a floating point number, e.g. $1.26 \times 10^4$.

On occasion, the output of the normalizing/rounding circuit 7 and the exponent processing assembly 6 comprises an exceptional result such as, for example, zero or infinity. In those cases, the exceptional result handling assembly 8 replaces the outputs of the normalizing/rounding circuit 7 and the exponent processing assembly 6 with a special number indicative of the exceptional result. This number then becomes the number F on the output line 36 which is further processed by the apparatus coupled to the output line 36.

In practice, each of the above-described assemblies and circuits are implemented using conventional combinatorial techniques which are well known to workers in the field of digital apparatus for providing the outputs desired in response to the inputs indicated. For that reason, it is contemplated that various arrangements of logic circuits may be used for providing the desired outputs in response to the inputs indicated.

While a preferred embodiment of the invention is disclosed, it is contemplated that various modifications may be made thereto without departing from the spirit and scope of the present invention. For that reason, it is intended that the embodiment described herein be considered only as illustrating the invention and that the scope of the invention be determined by reference to the claims hereinafter provided.

What is claimed is:

1. A fully combinatorial arithmetic apparatus for operating on a first and a second number, each of said numbers having a mantissa and an exponential component, comprising:
   means for processing the exponential components of said first and said second numbers;
   means coupled in parallel with said processing means and responsive to a control signal therefrom for aligning said mantissa of one of said numbers with said mantissa of the other of said numbers;
   means serially coupled to said aligning means for selectively adding or subtracting said mantissas of said first and said second numbers after they are aligned;
   means coupled in parallel with said processing means and said aligning and adding or subtracting means for multiplying said mantissas of said first and said second numbers;
   means for normalizing and rounding a mantissa, said normalizing and rounding means having an output coupled to said processing means for controlling the magnitude of an exponent from said processing means; and
   multiplexer means which is responsive to a control signal for selectively coupling outputs from said aligning and adding or subtracting means or said multiplying means to said normalizing and rounding means.

2. An apparatus according to claim 1 comprising exceptional result handling means which has an output and which is responsive to an exceptional result from either said exponential components processing means or said normalizing means for providing a predetermined number corresponding to said exceptional result at said output of said exceptional result handling means.

3. An apparatus according to claim 1 wherein said exponential component processing means comprises means responsive to said exponential components of said first and said second numbers and a first control signal indicating that either an addition or a subtraction is to be performed for providing a second control signal corresponding to a numerical difference between said exponential components and said aligning and adding or subtracting means comprises means responsive to said second control signal for aligning in a corresponding manner the mantissa of a predetermined one of said numbers with the mantissa of the other of said numbers.

4. An apparatus according to claim 4 wherein said second control signal providing means of said exponential component processing means comprises means for providing a second control signal which corresponds to the change required to be made to the numerical value of the lesser of the exponential components of said numbers to equalize said exponential components and said aligning and adding or subtracting means comprises means responsive to said second control signal for aligning the mantissa of the number having said lesser exponential component with the mantissa of the other of said numbers.

5. An apparatus according to claim 3 wherein said exponential component processing means comprises means for providing an output corresponding to the greater of said exponential components of said numbers.

6. An apparatus according to claim 3 wherein said adding and subtracting means comprises means coupled to said aligning means which is responsive to a control signal for selectively adding and subtracting the mantissas of said numbers after the mantissa of said predetermined one of said numbers is aligned with the mantissa of the other of said numbers.

7. An apparatus according to claim 4 wherein said second control signal providing means of said exponential component processing means and said mantissa aligning and adding or subtracting means comprises means responsive to the difference between said exponential components for shifting the mantissa of the number having said lesser of the exponential components relative to the mantissa of the other number by a predetermined number of places corresponding to the magnitude of said difference.

8. An apparatus according to claim 1 wherein said normalizing and rounding means comprises means responsive to said output from said multiplexing means for providing an output comprising a normalized mantissa corresponding to a number comprising a predetermined number of integers and a control signal corresponding to the value of an exponential component associated with providing said normalized mantissa.

9. An apparatus according to claim 8 wherein said means for providing said output comprises means for shifting the output of said multiplexing means a number of places to provide said normalized mantissa corresponding to a number comprising a single integer and said control signal corresponds to the direction and number of places said output of said multiplexing means is shifted.

* * * * *